United States Patent [19]

Francart, Jr.

[11] Patent Number: 5,426,990
[45] Date of Patent: Jun. 27, 1995

[54] OVER-CENTER TOGGLE LINKAGE VALVE ACTUATING MECHANISM WITH ADJUSTABLE TENSION SPRING PRELOADING

[75] Inventor: Armand Francart, Jr., Landenberg, Pa.

[73] Assignee: Eastern Machine, Inc., Landenberg, Pa.

[21] Appl. No.: 179,207

[22] Filed: Jan. 10, 1994

[51] Int. Cl.6 .............................................. F04B 9/08
[52] U.S. Cl. .................................... 74/100.1; 251/75; 137/445
[58] Field of Search ......................... 74/100.1; 251/75; 137/445

[56] References Cited

U.S. PATENT DOCUMENTS

| | | | |
|---|---|---|---|
| 1,910,060 | 5/1933 | Rose | 137/445 |
| 2,144,345 | 1/1939 | Schlecker | 74/100.1 |
| 2,399,099 | 4/1946 | Caron | 137/445 |
| 2,504,022 | 4/1950 | Hohner | 251/75 |
| 5,230,361 | 7/1993 | Carr et al. | 74/100.1 |

Primary Examiner—Charles A. Marmor
Assistant Examiner—David Fenstermacher
Attorney, Agent, or Firm—Sughrue, Mion, Zinn, Macpeak & Seas

[57] ABSTRACT

A toggle linkage over-center mechanism employs first and second solid, metal links having facing axial ends pivoted to each other for pivoting about a first axis, the first link is pivotably coupled at one end to the fixed support for pivoting about a second pivot axis. The second link has an opposite axial end pivotably coupled about a third axis to an element for causing over-center movement of the pivotably coupled first and second links through a center line defined by the first and third pivot axes. Tension coil springs having opposite ends are pivotably coupled to respective outboard ends of the pivotably coupled first and second links. One of the rigid metal links is adjustable over its length to preload the tension coil springs to a sufficient magnitude to maintain preload tension within the over-center toggle linkage mechanism over the full range of movement of the toggle links between oppositely oblique over-center positions. The pivot axis between the end of the second link remote from the pivot connection between the first and second links defines a free pivot axis which moves relative to the fixed support. An actuator stem is pivotably mounted to the first link for pivoting about an axis parallel to the first, second and third pivot axes. The second link may be of dumbbell configuration and consist of two axial sections each having a cylindrical head, with one head having a tapped bore receiving a fine thread cylindrical shank sized and threaded to the tapped bore. Relative rotation between the two sections of the second link effect axial length adjustment of that link.

17 Claims, 3 Drawing Sheets

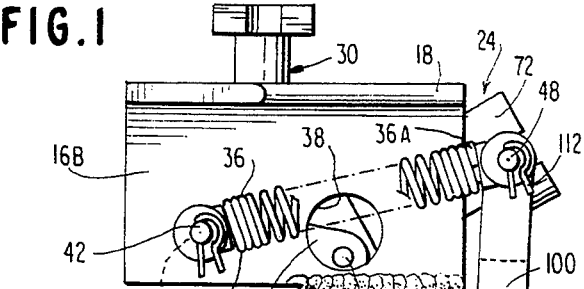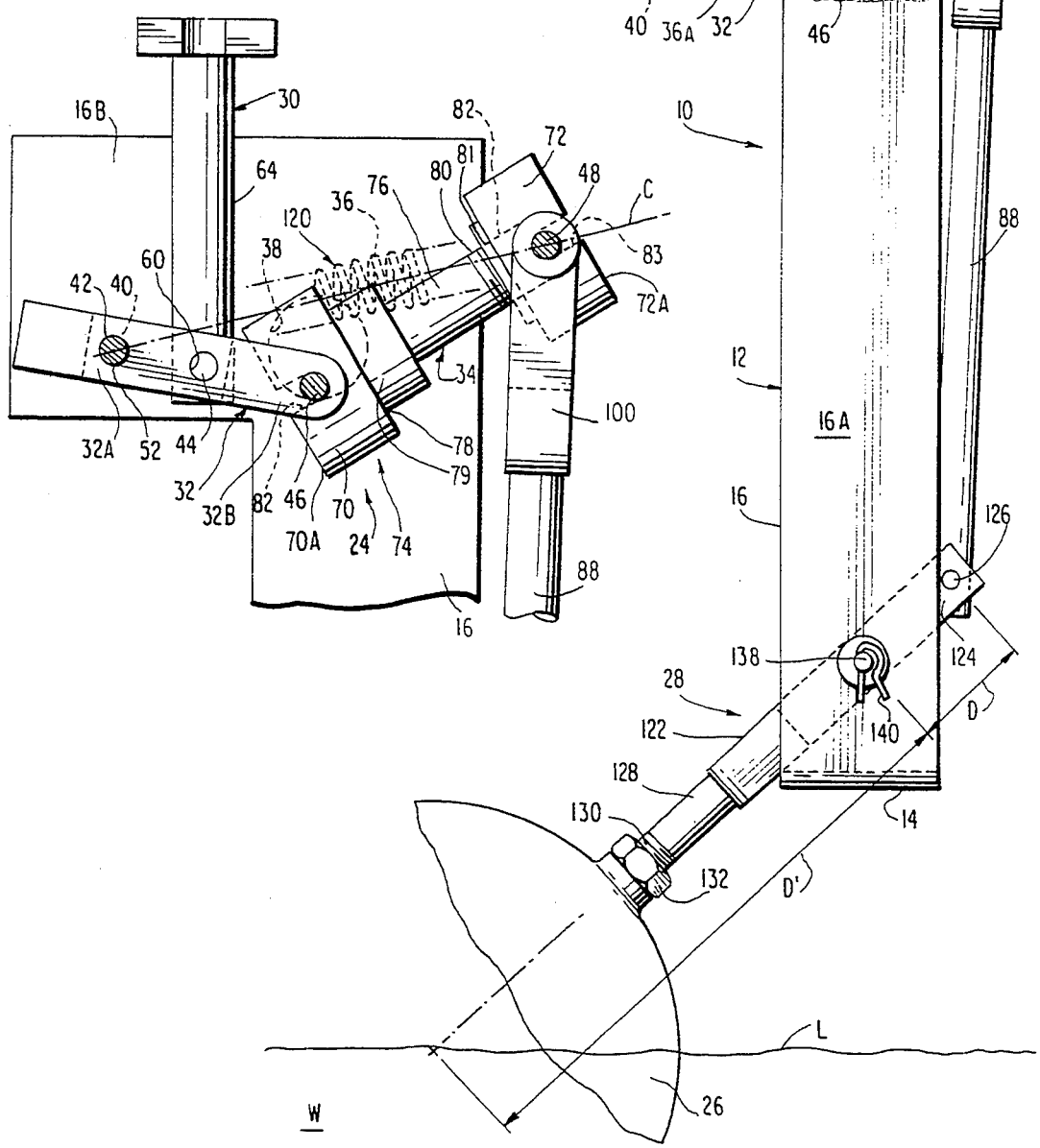

OVER-CENTER TOGGLE LINKAGE VALVE ACTUATING MECHANISM WITH ADJUSTABLE TENSION SPRING PRELOADING

FIELD OF THE INVENTION

This invention relates to over-center toggle linkage valve actuating mechanisms particularly useful for liquid pumping systems, and more particularly to a toggle linkage mechanism in which one of the two solid links is of adjustable length for preloading one or more tension springs tending to bias the toggle linkage in alternate, cross-over center positions, with bias maintained continuously throughout the toggle linkage movement to alternate oppositely oblique over-center positions.

BACKGROUND OF THE INVENTION

Toggle linkage over-center float-operated valve actuating mechanisms are useful in controlling the filling of a closed or sealed pressure vessel and for driving an accumulated liquid periodically from the vessel. Typically, a vent valve vents the interior of the vessel to the atmosphere and a second pressure valve subjected to high pressure inlet fluids admits live steam to drive an accumulated liquid from the vessel. In filling the vessel, the vent valve is in the open position, and the pressure valve is closed by a single float-operated over-center toggle linkage valve actuating mechanism. As the vessel fills with liquid, the float rises and a pivotable float arm forming part of the valve actuating mechanism is swung or pivoted about a pivot point at an end remote from the float. That end is mechanically coupled to an over-center toggle linkage mechanism to move that mechanism towards a center, link in line position against a spring bias. Such mechanisms have toggle links which snap quickly through the center line position, attempting to close the vent valve simultaneously with snap opening of the high pressure inlet valve to pump the accumulated liquid from the vessel, and vice versa. Typically, a tension coil spring provides such biasing force, with the tension coil spring coupled at opposite ends to movable elements of the valve actuating mechanism; normally the opposite ends of two toggle links, which themselves are pivoted to each other remote from the spring coupling points.

Applicant's U.S. Pat. No. 5,141,405, issued Aug. 25, 1992, incorporates a compression coil spring under precompression as one of the toggle links to ensure that the open valve remains open and that the other closed valve remains closed on the valve seats until the precise moment that the toggle linkage moves over-center to change the state of both valves. In such mechanism, the pivot connection between one end of a compression coil spring (or dual compression coil springs), is pivotably coupled at a selected longitudinal position on a respective spring preload and swing arm (or arms) directly coupled to the float. In such case, the compression coil spring(s) is either additionally preloaded, i.e, compressed, or offloaded by expansion of the compression coil spring.

Such float operated over-center valve actuating mechanism requires the utilization of preload arms, is limited to the substitution of a compression coil spring for one of the solid metal toggle links and requires the selection of a spring constant for the compression coil spring correlated to the pressures encountered in liquid pumping systems which vary greatly, as do the liquids to be pumped, materially affecting the buoyancy forces acting on the float to cause over-center toggle linkage movement to change the state of the valves.

The applicant has ascertained certain problems when using a toggle linkage over-center valve actuating mechanism which employs one or several tension coil springs. Typically the spring tension is set by the factory to cover normal situations where the pump opens against a high pressure fluid such as steam. Typically manufacturers employ a heavy enough coil spring to open against 150 pounds of steam. To provide the desired utility to the pump, the manufacturer must provide a variety of springs, that is springs having a variety of spring constants. Additionally, in many of the toggle linkage over-center valve actuating mechanisms employing tension springs, the springs are slack when the toggle links are over-center, that is, they lack any force on the toggle linkage in the oppositely oblique, extreme over-center positions of the toggle links. Where the spring at opposite ends is connected to the ends of the toggle links remote from their center, common pivot connection, the spring stretches in both directions from its center point in the plane of the pivot connection between the links.

The applicant has further noted that since it is the float which causes valve actuation and over-center action, the mechanism does not sense the pressure within the interior of the pump housing; the valve opens only as a result or rise and drop of the accumulated liquid, which liquid must be pumped out by the driving fluid such as steam when that liquid reaches a predetermined level.

It is highly desirable therefore to have a toggle linkage over-center valve mechanism which works properly under conditions where the liquids to be pumped vary and where the gas pressure to affect that pumping may vary over a wide spectrum of pressures.

The applicant is also aware of the fact that upon drop in liquid level, the float is required to actuate the over-center toggle linkage. Such requires the dual links to pass through the center line position between the extreme pivot points at the opposite ends of the links, one of which is pivoted to a fixed frame, and the other to an element of the float and against the spring biasing force. Such reversing the state of the over-center valve actuating toggle linkage depends primarily on the mass of the float, and the float arm and its attendant elements coupled at an opposite end to a toggle link. Where the pump including the toggle linkage over-center valve actuating mechanism is designed to handle a liquid such as water, the pump may have difficulty in handling a naphtha because the buoyancy of the float by naphtha is quite different than that of water. In addition, where one may normally employ steam as the driving medium for opening the valve and to force the liquid to be pumped by the pressure fluid from the pump housing or other liquid container depending on the properties of the liquid, a different gas or pressure fluid may be required, such as nitrogen. Where one is pumping a liquid hydrocarbon or sulfuric acid, the selection of the gas would have to be one which is compatible with the liquid accumulating and requiring pumping, and in such case steam would not be applicable.

It is therefore a primary object of this invention to provide an improved, snap acting toggle linkage over-center valve actuating mechanism, of low cost, of simplified construction, which employs tension springs which may be preloaded, wherein the biasing force of the springs is maintained throughout the complete movement of the toggle linkage from one over-center position to the other, which permits onsite preloading of a tension coil spring or springs and which eliminates the necessity of correlation of the tension coil springs to the gas pressure of the drive fluid and the buoyancy force characteristics of the liquid to be pumped.

BRIEF DESCRIPTION OF THE DRAWINGS

FIG. 1 is a side elevational view of a float-operated, over-center toggle linkage, valve actuating mechanism forming a preferred embodiment of the invention.

FIG. 4 is a side sectional view of the mechanism of FIG. 3 taken along line 4—4.

DETAILED DESCRIPTION OF THE PREFERRED EMBODIMENT

Figures 2, 3:
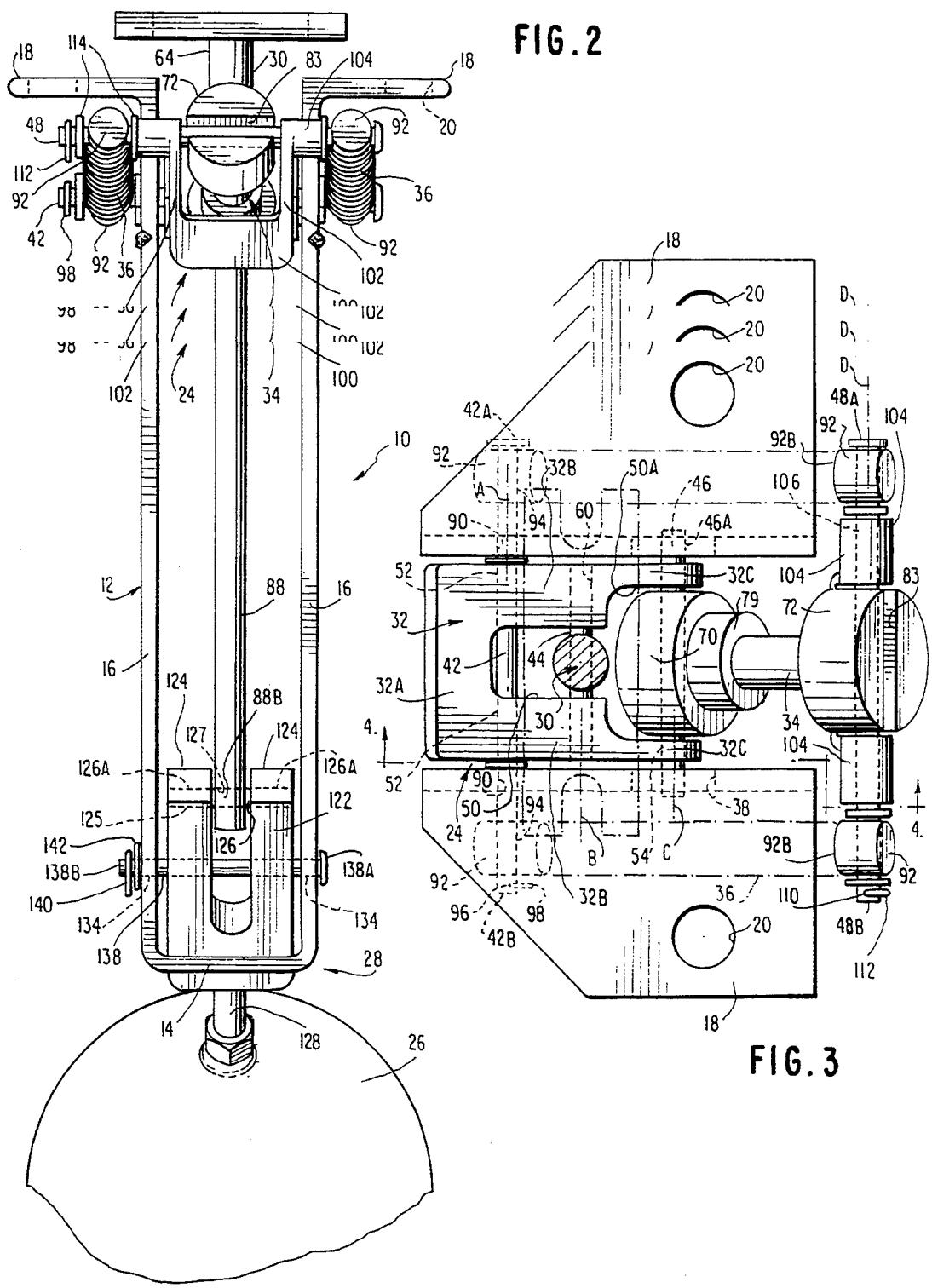
FIG. 2 is a vertical end view of the mechanism of FIG. 1.
FIG. 3 is a top plan view, partially broken away of the mechanism of FIG. 1.

Referring to the drawings, the over-center toggle linkage valve actuating mechanism preferably for use in a liquid pumping system, is indicated generally at 10. It is comprised principally of a fixed frame indicated generally at 12, a toggle linkage indicated generally at 24, a ball float 26, a force amplification mechanism indicated generally at 28 connecting the ball float 26 to the toggle linkage 24, and an actuator or push rod 30 for controlling and operating a valve assembly (not shown) of the type shown in applicant's U.S. Pat. No. 5,141,405, whose content as shown in FIGS. 1 and 1A of that patent is incorporated herein by reference.

Figure 5:
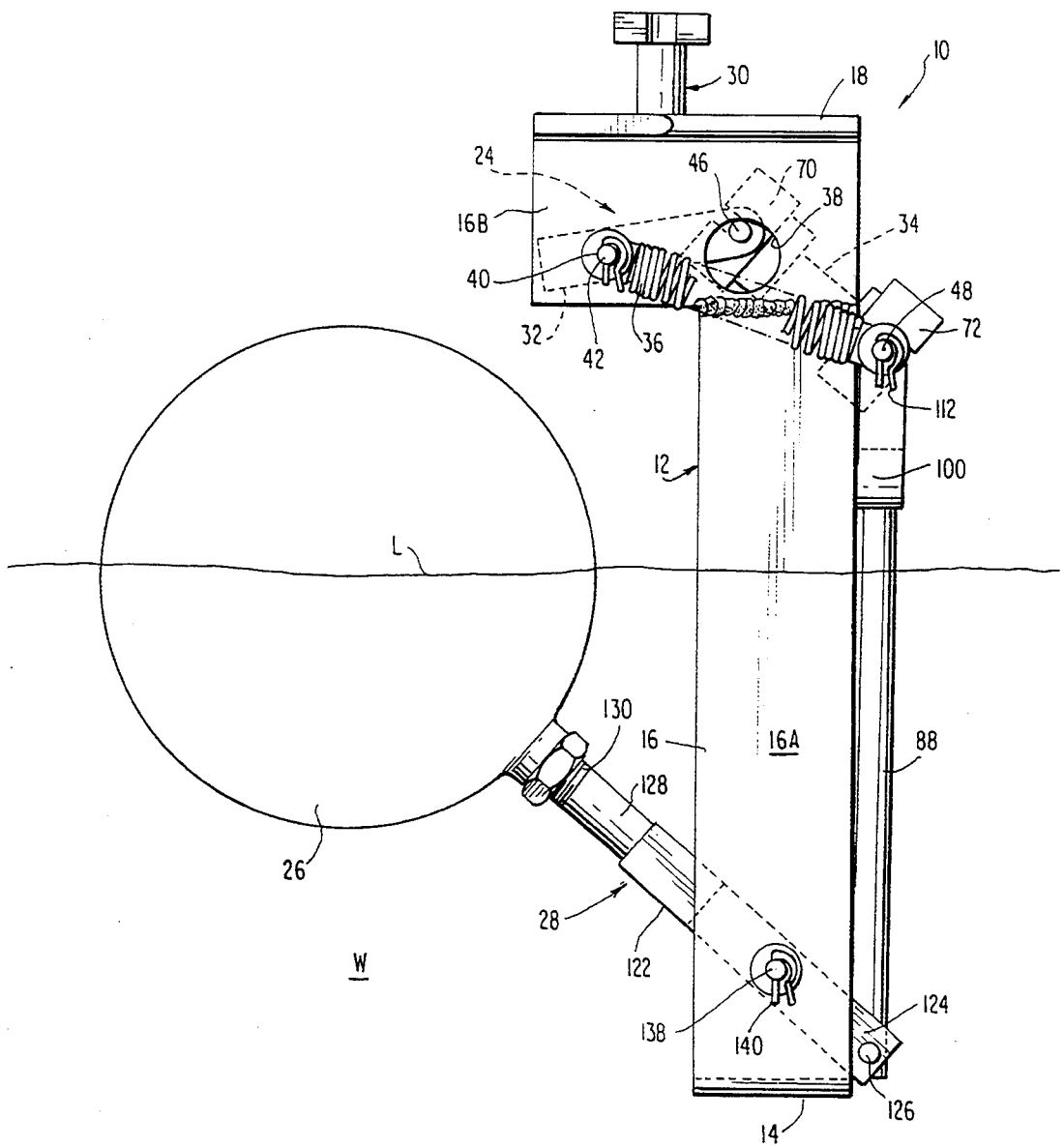
FIG. 5 is a vertical sectional view of the mechanism, similar to that of FIG. 1 with the toggle links in oppositely oblique, over-center position to that of FIG. 1.

The toggle linkage 24 consists of a first rigid material, non-expandable or contractible, preferably metal link 32, and a second rigid material toggle link 34. Such toggle linkage is spring biased in either of two, oppositely oblique over-center positions as shown in FIGS. 4 and 5, which positions alternate. FIG. 4 illustrates the position of the valve actuating mechanism after pumping liquid from a pump, with the liquid level L and the float 26 at their lowest positions. That of FIG. 5 shows the float 26 as having risen appreciatably to drive the toggle linkage 24 over-center so as to significantly raise the actuator or push rod 30 from the position shown in FIG. 4, to that of FIG. 5.

At that point, the pressure fluid valve (not shown) opens, the liquid valve (not shown) closes, and the pump is gas pressurized to again drive the accumulated liquid W from the interior of the pump casing. As a result, the liquid level L drops to that shown in FIG. 4 and the ball float drops by gravity causing a change in state of the toggle linkage to the position shown in FIG. 4.

Such action is in accordance with the description in applicant's prior U.S. Pat. No. 5,141,405.

The present invention is directed to the float-operated, preloaded tension spring biased over-center toggle linkage valve actuating mechanism 10. In that respect, the fixed frame 12 is of generally U-shape and consists of a horizontal, transverse base or crossbar 14 integrally formed or fixed to the lower ends of laterally opposed vertical side walls 16. The sidewalls 16 extend upwardly from the base and terminate in integral oppositely, outwardly directed flanges 18. The flanges 18 are provided with holes as at 20 permitting the fixed frame to be bolted to the interior of a pump pressure vessel or the like (not shown).

The sidewalls 16 of the fixed frame 12 are of inverted L shape, each having a narrow vertical portion 16A rising from base or crossbar 14 to their upper ends and terminating in integral, right angle, rearwardly projecting sidewall portions 16B. Each of the sidewall portion 16 is provided with a pair of circular holes. A relatively large diameter circular hole 38 is proximate to the connection between the horizontal portion 16B and the vertical portion 16A of each inverted L shape sidewall. Large holes 38 can be varied in diameter to control the angular position of the float which, when aligned with all of the three pins, can vary the snap point in relation to the float position. A smaller diameter hole 40 horizontally in line with hole 38 is proximate to the outer end of the leg 16B of each sidewall. Mounted between the laterally spaced sidewalls of the outwardly opened U shape fixed frame 12 is the toggle linkage 24 consisting of a first rigid metal internal link or yoke 32 having one end or base 32A pivotably mounted to the fixed frame sidewall leg 16B for pivoting about a fixed axis defined by a first pin 42, and having an opposite end or arm 32B pivotably coupled to a second rigid metal link 34 by a second, pivot pin 46. The opposite end of the second link 34 is pivotably connected via a third pin 48, to a crank arm 88 forming one element of the force amplification mechanism 28.

The third pin 48 does not pass through the fixed frame, and that connection is a free pivot connection limited only to available rotational positions of the second link 34, and the crank arm 88.

As seen best in FIG. 3, the first link 32 is formed of a stamped or cast metal plate of generally rectangular configuration in the form of a yoke having a base 32A, extending transversely and being of a width less than the width between the two side plates 16 of the fixed frame. Yoke 32 has arms 32B extending at right angles to the base and outwardly thereof. A narrow width slot 50 is formed centrally of the toggle link 32, and extends away from the base 32A with the arms 32B being narrowed as at 32C to define a widened portion 50A of the slot 50. A pair of axially aligned holes 52 are formed within arms 32B sized to rotatably carry the first pin 42 such that the first link 32 rotates about a fixed pivot axis A on the fixed frame 12. Additionally, the arms 32B at their ends remote from base 32A are provided with axially aligned small diameter holes 52, 60, 54 in order from the rear to the front of the over-center valve actuator 10. In front of pivot pin 42, a pair of axially aligned holes 60 of small diameter fixably mount by friction fit, a small diameter pivot pin 44 which pin 44 passes through slot 50 and within which is positioned the lower end of a vertically upright rod 64 of the valve actuating rod assembly 30. Thus the lower end of the actuator rod 64 is pivotable about the axis B of pivot pin 44, and between the arms 32B of the U shaped yoke, first solid metal link 32. A pair of axially aligned holes 54 within the reduced thickness legs 32B of link 32 receive a pivot pin 46 of a diameter slightly smaller than the diameter of the holes 54. The pivot pin 46 pivots about a pivot axis C. Further, the opposite projecting ends 46A of that pivot pin projects through the larger diameter axially aligned holes 38 within respective sidewalls 16 of the fixed frame 12. During over-center movement of the toggle linkage 24, the ends 46A abut diametrically, vertical opposite top and bottom edges of holes 38 which define stops for the toggle linkage during alternate upwardly oblique and downwardly oblique positioning of the toggle links 32, 34 relative to each other as effected by a rise in the level L of the water W FIG. 1 acting on the ball float 26 of the float actuator mechanism 28, and fall of the same.

Unlike toggle link 32, the second toggle link 34 does not have its pivot pins passing through aligned circular holes or through a bore within the respective opposite ends of toggle link 34. The pivot pin 46 fits into a rectangular cross-section slot 82 formed within a first outer face 70A of head 70 of solid metal toggle link 34. The opposite end of the toggle link 34 carries a second similarly sized, radially enlarged head 72. Head 72 carries a rectangular cross-section slot 83 within outer face 72A thereof. Both heads 70 and 72 are of cylindrical form. Further, link 34 is formed of two solid metal parts, a first metal part indicated generally at 74 and the second part being constituted totally by the head 72. The first part 74 of the toggle link 34 is a machined or otherwise formed metal piece of cylindrical form, having a relatively small diameter shank 76, welded at 78 to a reduced diameter or stepped portion 79 of head 70. The sections 70, 79 and 76 of first part 74 of the second link are coaxial. The shank 76 has threads at 80 at the end remote from head 70 which are threaded into a tapped hole or bore 82 within the second part or head 72 of the toggle link. Head 70 of the toggle link 34 carries a transverse slot 82, within face 70A which is slightly wider than the diameter of the pivot pin 46 received therein and of a depth in excess of that diameter. At the opposite end of the second toggle link 34, the outer face 72A, of head 72 directed away from the toggle link first section 76, carries a rectangular slot 83 extending transversely from one side to the other which is of a width in excess of the diameter of the pivot pin 48, within which slot 83 the pin 48 is positioned. The depth of that slot is in excess of the diameter of the pivot pin 48.

The pivot pin 42 and the pivot pin 48 are much longer in length than pivot pins 44 and 46. The pivot pin 42 is required to extend through axially aligned bores or holes 52 within respective arms 32B of the first link 32, inwardly of base 32A, sized slightly larger than the diameter of the pivot pin 42, as well as axially aligned bores 90 within the fixed frame sidewall portions 16B. The pivot pin 42 is freely rotatable within both the sidewalls 16 of the fixed frame, and the link 32 is freely rotatable about axis A of pivot pin 42. Opposite head end 42A and shank end 42B of the first pivot pin 42 rotatably support solid metal cylindrical heads 92, the heads 92 each having a bore 94 through those members at right angles to the axis of the cylindrical heads, bore 94 being slightly larger than the diameter of the pivot pin 42 and receiving the ends 42A of the same. The projecting ends 42B of each pin each carry a small diameter hole 96 which passes through the end 42B at right angles to the axis A of the pivot pin 42 and within which project cotterpin 98, locking the pivot pin 42 to heads 92.

To the front of the assembly, a similar sized and length pivot pin 46 is pivotably connected to an upper yoke 100 at the upper end of the crank arm 88. Yoke 100 is of U shape configuration, with a pair of parallel arms 102 extending parallel to the axis of crank arm 88, and being spaced laterally a distance slightly in excess of the diameter of head 72 of toggle link 34. The arms 102 of the crank arm yoke 100, terminate at their outboard ends, in right angle cylindrical bosses 104 which are axially bored at 106 slightly larger in diameter than the diameter of the pivot pin 48 which passes therethrough. The bosses 104 extend slightly beyond the outside surfaces of the opposite vertically upright sidewalls 16 of the fixed frame 12. The central portion of the pivot pin 48 between arms 102 of the yoke 100 is received within the transverse slot 83 within face 72A of the second toggle link head 72. One outboard end 48B of the third pivot pin 48 carries a cylindrical head 92 inside of a small diameter hole 110 passing through that end at right angle to the pivot axis D of that pin, through which hole 110 extends cotterpin 112. The other end of the pivot pin 48 has a radially enlarged head at 48A which rides on the outer periphery of a further cylindrical head 92. Interspersed between heads 92 on respective pivot pins 42 and 48 and the free ends of bosses 104 of pivot pin 48 are several washers to ensure free rotation of the heads 92 about the axis D of the third pivot pin 48. To the rear end of the assembly, similar washers 114 are interposed on pivot pin 42 between the cylindrical heads 92 and the exterior surfaces of the vertical sidewalls 16 of the fixed frame, for the same purpose.

The tension coil springs 36 are of a length when in fully relaxed condition, which are shorter than the distance between the cylindrical heads 92 of the respective first and fourth pivot pins 42, 48. Further, the heads 92 have relatively large diameter portions through which the pivot pin passes for pivotably mounting those heads to respective outboard pivot pin ends. Heads 92 have reduced diameter portions 92B sized to the inner diameter of the tension coil springs 36. Opposite ends 36A of the tension coil springs are welded or otherwise fixably mounted to those reduced diameter portions 92B of the spring pivot heads 92. During snap action movement, there is a limited rotation of the coil spring assemblies 120 defined by the coil springs 36 and their pivot heads 92 at opposite ends. A swinging or pivoting movement is about the fixed pivot axis A, defined by the pivot pin 42. The tension coil springs 36 are made so as to freely flex over their major length between the fixed connections at the opposite ends 36A to the pivot heads 92 for each coil spring assembly 120.

Actuation of the toggle linkage 24 against the spring bias of the tension coil springs 36 is effected by the force amplification mechanism indicated generally at 28. In that respect, crank arm 88 is pivotably connected between laterally spaced arms 124 of a U shaped yoke member or bifurcated float arm 122, the arms 124 spaced from each other a distance permitting passage of the lower end 88B of the crank arm 88 therethrough. A hole 127 is drilled or otherwise formed through the lower end 88B of the crank arm at right angles to its axis and a pivot pin 126 is force fitted into that hole such that opposite ends 126A project outwardly therefrom. Those ends 126A are received within respective aligned bores 125 of laterally spaced arms 124 of a bifurcated float arm 122 terminating at a lower end in a solid rod 128 which is threaded at 130, and which may be received within a tapped hole within a nut 132 fixed to the exterior of the ball float 26. Thus the rod 128 and the bifurcated arms 124 of the float arm 122 extend radially away from the ball float with their arms 124 pivoted, about pin 126 defining a fifth pivot axis, to the lower end of the crank arm 88. Further, a pair of horizontal axis, circular holes 134 are formed within respective sidewalls 16 of the fixed frame at some distance above the crossbar or base 14 of that member. Projecting through those holes is a pivot pin 138, defining a fourth pivot axis, having a head 138A at one end, and at an opposite end 138B carrying a diametrically extending small diameter hole which receives a cotterpin 140. Preferably, washers at 142 are provided between the headed end 136A and the outside face of the fixed frame sidewall 16 as well as between the outside face of the opposite sidewall 16 and the cotterpin 140.

This not only takes the slop out of the tension coil springs 36 for the over-center toggle mechanism 10, but insures a pretensioning force acting on the valve operating assembly and particularly operating valve assembly 30, and thereby maintaining one of the valves closed and the other open until the toggle links 32, 34 move to a position of alignment with a center line C extending through the fixed pivot axis A and the movable pivot axis D, at opposite ends of toggle linkage 24. The open valve is maintained open and the closed valve closed until the actual instance of toggle linkage over-center movement past the center line C of the hinged toggle links 32, 34.

A key aspect is the rigid material toggle link 34, whose axial length may be fine tuned and which pretension force may be maintained, while coupled at one end to the other of the rigid metal toggle links as at 32, with the opposite end pivoted to the float arm or to an element of a force amplification system incorporating such float arm as for instance the crank arm 88 in the embodiment.

Preferably, the rigid metal toggle link 34 is of dumbbell configuration comprised of the two, axially spaced radially enlarged cylindrical heads 70, 72. Head 72 has an axial bore which is tapped with very fine threads 81, that bore being sized to the threaded portion 80 of the shank 76 which is integral with and which extends axially from the opposite head 70. The adjustable length rigid metal toggle link 34 is further characterized by the transverse grooves as at 82 within head 70, and at 83 within head 72. They receive respectively pivot pin 46 and pivot pin 48 to effect the desired couplings. The slots or grooves 82, 83 facilitate the assembly of toggle linkage 24 and the adjustment of the length of link 34. By minimizing the pitch of the threads on the shank 76 and the tapped bore 81 within head 72, rotation of head 72 relative to shank 76 by as little as ½ turn will result in significant increase or decrease of the pretension force of the tension coil springs 36 to opposite side of the links 32, 34 of toggle linkage 24. Such preloading of the toggle linkage 24 may be effected at the factory, or on site. A very fine pitch permits for a ½ rotation of one section of the solid, rigid metal toggle link 34 section relative to the other an increase or decrease axial length change of 0.005 of an inch. Such provides relatively, an infinitely fine adjustment of the preloaded, pretensioned coil springs 36. There is no need to change coil springs to accommodate large variations in gas pressure for a typical gas pressure powered liquid pump whose driving gas pressure may be typically steam at 100 pounds, 150 pounds, 200 pounds, etc. Such toggle link 34 permits ready adjustment of the toggle linkage 24 to meet the density and buoyancy forces of various liquids accumulating within a pump pressure vessel or similar apparatus.

While the invention has been illustrated in terms of a preferred embodiment, it should be understood, that various changes in form and proportion may be resorted to within the scope of the appended claims and the claims are not limited to the example described in detail herein.

What is claimed is:

1. An over-center toggle linkage mechanism comprising:

a fixed support, first and second rigid material toggle links having opposite axial ends, means for pivotably coupling said links together at one end for rotation about a second pivot axis at right angles to axes of said links, means for coupling one of said links to an end use device, means pivoting the other end of said first link to said fixed support for pivoting about a first axis, parallel to said second axis, means operatively pivotably coupling the other end of said second link to a float for pivoting about a third axis, parallel to said first and second axes with free movement of said other end of said second link relative to said fixed support and forming with said first rigid material toggle link, an over-center toggle linkage, at least one tension coil spring having opposite ends, means for coupling one end of said at least one tension coil spring to said fixed support at said first pivot axis and the other end of said tension coil spring to said second rigid metal toggle link at said third pivot axis, stops operatively coupled to said fixed support for limiting pivoting of said over-center toggle linkage about said second pivot axis between opposite oblique toggle linkage over-center positions, and means for adjusting the axial length of one of said rigid material toggle links to preload said at least one tension coil spring at a predetermined tension force of a magnitude capable of maintaining the preload tension within said at least one tension coil spring on said toggle linkage over a full range of movement of said toggle linkage between oppositely oblique over-center positions with respect to a center line extending through said first and third pivot axes, and means for activating said end of said other toggle link to cause said toggle linkage to move over-center with respect to said center line to cause a shift in position of said end use device while maintaining a coil spring tension biasing force on said means for activating during over-center movement of said toggle linkage between said oppositely oblique over-center positions such that both toggle links instantly snap over into said oppositely oblique over-center positions.

2. The mechanism of claim 1 wherein said second rigid material link comprises two longitudinally separate axial sections, and means for interconnecting said sections and for adjusting the distance of one section longitudinally with respect to the other section.

3. The mechanism as claimed in claim 2, wherein one of said sections includes a tapped bore, and the other of said sections includes a cylindrical shank having a threaded end threaded into said tapped bore.

4. The mechanism as claimed in claim 1, wherein said first link is the link which is remote from the third pivot axis.

5. The mechanism as claimed in claim 3, wherein said rigid material link sections are of cylindrical form, said first section includes an axial bore within an end of the section facing the other section, and wherein said other section includes a reduced diameter shank of a diameter sized to that of said bore.

6. The mechanism as claimed in claim 5, wherein said threaded shank and said tapped bore have matching threads of a fine pitch wherein, rotation of said one section about the other over approximately 180 degrees, causes a change in axial length of said one link in the amount of 0.005 of an inch.

7. The mechanism as claimed in claim 5, wherein the adjustable length link comprises cylindrical heads at opposite ends thereof, and said cylindrical heads including end faces thereof facing away from each other, transverse slots within said end faces pass through the axis of the adjustable length link, for receiving pivot pins whose axes are transverse to the axis of the adjustable length link, and which define, the second and third pivot axes of said over-center toggle linkage valve actuating mechanism.

8. The mechanism as claimed in claim 1, wherein an actuator stem is pivotably mounted to said one link for pivoting about an axis perpendicular to said one link and extending outwardly of said one link and constituting said means for coupling to an end use device.

9. The mechanism as claimed in claim 8, wherein said one link is said first link having an end thereof pivotably mounted to said fixed support for pivoting about said first axis.

10. The mechanism as claimed in claim 1, wherein said fixed support comprises a fixed frame having laterally opposed, spaced sidewalls, said first and second links are sized to fit between said sidewalls, said means for pivoting the other end of said first link comprises said sidewalls including a first pair of aligned holes proximate to one side of said sidewalls, a first pivot pin is rotatably mounted within said aligned first holes and being sized slightly smaller than the diameter of said holes and having axial ends projecting outwardly from opposite sidewalls and passing through said aligned holes and extending beyond the opposite sidewalls, said first toggle link having a transverse hole passing therethrough and rotatably receiving an end of said first pivot pin, said sidewalls further including a pair of aligned large diameter holes, said means for pivotably coupling said links comprising a second pivot pin pivotably coupling said one end of said first link and one end of said second link and being of a length so as to extend through said large diameter holes within said frame sidewalls, said second pivot pin constituting said second pivot axis, said second link carrying at said other end a third pivot pin defining said third pivot axis, said third pivot pin being outside of said sidewalls and having ends extending longitudinally respectively beyond said sidewalls, and wherein said at least one tension coil spring comprises two tension coil springs and said means for pivotably coupling said tension coil springs comprises pivotably coupling opposite ends of said tension coil springs to the respective ends of said first and third pins exterior of respective sidewalls and defining therebetween said center line for said over-center toggle linkage.

11. The mechanism as claimed in claim 10, wherein cylindrical pivot heads having transverse bores passing therethrough receive said ends of said first and third pivot pins within said transverse bores and are fixably coupled respectively to opposite ends of said tension coil springs and constitute said means for pivotable of the opposite ends of said tension coil springs to said first pivot axis and said third pivot axis respectively.

12. The mechanism as claimed in claim 10, wherein a float is fixably mounted to a float arm, said float arm at a point remote from said float is pivoted to said sidewalls for pivoting about a fourth axis at right angles to the axis of the float arm, and a crank arm is pivotably mounted at one end to said second link for pivoting about said third axis, and said crank arm is pivotably connected about a fifth axis at an opposite end thereof to the end of said float arm to the side of said frame opposite said float, such that by raising and lowering said float relative to said frame said toggle linkage is caused to move over-center in a snap action under the biasing force of said at least one spring.

13. The mechanism as claimed in claim 12, wherein said float arm is bifurcated at the end remote from said float, and a pivot pin extends transversely through the bifurcation of said float arm and through a hole within said opposite end of said crank arm proximate to said float arm and pivotably coupling said crank arm and said float arm for pivoting about said fifth axis.

14. The mechanism as claimed in claim 12, wherein said crank arm is bifurcated at its said one end and wherein, transverse holes are formed within said bifurcated portion of said crank arm and said third pivot pin is rotatably mounted within said bifurcations and passes through the other end of said second link.

15. The mechanism as claimed in claim 14, wherein said second end of said other link comprises a transverse slot, and said third pin is fitted within said slot and forms a pivot connection between the third pin and the transverse slot within the second end of said second link.

16. The mechanism as claimed in claim 12, wherein said float is at a distance from said fourth pivot axis is in excess of the distance between the fourth pivot axis and the fifth pivot axis such that said float arm and said crank arm constitute a force amplification mechanism for amplifying a force generated by flotation of said float and acting on said over-center toggle linkage.

17. The mechanism as claimed in claim 1, wherein said first and second links are rigid metal links.

* * * * *